United States Patent
Paduroiu

(10) Patent No.: US 10,594,759 B2
(45) Date of Patent: Mar. 17, 2020

(54) EFFICIENTLY EXECUTING CONCURRENT OPERATIONS THAT DEPEND ON EACH OTHER IN A STREAMING DATA ENVIRONMENT

(71) Applicant: EMC IP Holding Company LLC, Hopkinton, MA (US)

(72) Inventor: Andrei Paduroiu, Kirkland, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 155 days.

(21) Appl. No.: 15/974,922

(22) Filed: May 9, 2018

(65) Prior Publication Data
US 2018/0332087 A1 Nov. 15, 2018

Related U.S. Application Data

(60) Provisional application No. 62/503,845, filed on May 9, 2017.

(51) Int. Cl.
| | |
|---|---|
| *H04L 29/06* | (2006.01) |
| *H04L 12/54* | (2013.01) |
| *G06F 16/23* | (2019.01) |
| *H04L 29/08* | (2006.01) |
| *H04N 21/845* | (2011.01) |
| *H04N 21/433* | (2011.01) |
| *H04N 21/242* | (2011.01) |
| *H04L 9/06* | (2006.01) |
| *H04L 12/743* | (2013.01) |

(52) U.S. Cl.
CPC ........ *H04L 65/607* (2013.01); *G06F 16/2358* (2019.01); *G06F 16/2379* (2019.01); *H04L 9/0643* (2013.01); *H04L 12/5602* (2013.01); *H04L 45/7453* (2013.01); *H04L 65/4069* (2013.01); *H04L 65/4084* (2013.01); *H04L 65/60* (2013.01); *H04L 65/601* (2013.01); *H04L 65/604* (2013.01); *H04L 67/26* (2013.01); *H04L 67/2833* (2013.01); *H04L 67/2842* (2013.01); *H04N 21/242* (2013.01); *H04N 21/4331* (2013.01); *H04N 21/845* (2013.01); *H04N 21/8456* (2013.01); *H04N 21/8458* (2013.01); *H04L 65/608* (2013.01); *H04L 65/80* (2013.01); *H04L 67/1097* (2013.01)

(58) Field of Classification Search
CPC . G06F 16/2379; H04L 65/4084; H04L 65/60; H04L 65/607; H04L 67/2833; H04N 21/845
See application file for complete search history.

(56) References Cited

U.S. PATENT DOCUMENTS

| | | | |
|---|---|---|---|
| 9,621,926 B1 * | 4/2017 | Lee ....................... | H04N 21/234 |
| 2011/0013882 A1 * | 1/2011 | Kusunoki ............ | G11B 27/034 |
| | | | 386/241 |

* cited by examiner

*Primary Examiner* — Mohamed A. Wasel
(74) *Attorney, Agent, or Firm* — Krishnendu Gupta

(57) ABSTRACT

Implementations are provided herein for accepting operations asynchronously in a particular order and efficiently committing them into an append-only log while preserving relative order. Operations that are dependent on one or more operations prior to it in the log will be guaranteed to fail, and not accepted, if any of the prior operations failed. If an operation succeeds, it is guaranteed that all operations it depended on are also successful.

15 Claims, 18 Drawing Sheets

EFFICIENTLY EXECUTING CONCURRENT OPERATIONS THAT DEPEND ON EACH OTHER IN A STREAMING DATA ENVIRONMENT

CROSS REFERENCE TO RELATED APPLICATIONS

This application claims the benefit of U.S. Provisional Application No. 62/503,845 filed May 9, 2017.

FIELD OF THE INVENTION

This invention relates generally to processing data, and more particularly to processing streaming data.

BACKGROUND OF THE INVENTION

Streaming applications are applications that deal with a large amount of data arriving continuously. In processing streaming application data, the data can arrive late, arrive out of order, and the processing can undergo failure conditions. It can be appreciated that tools designed for previous generations of big data applications may not be ideally suited to process and store streaming application data.

Enabling streaming applications to store large amounts of data from a storage perspective can be challenging. There is a need to determine the proper storage primitive that would ideally be suited for building a new generation of streaming applications in conjunction with existing tools like Apache Flink. In using a Lambda architecture, a developer may use a complex combination of middleware tools that include batch style middleware influenced by platforms like Apache Hadoop and continuous processing tools like Apache Storm, Apache Samza, Apache Kafka and others. Batch style processing can be used to deliver accurate but potentially out of data analysis of data. It can be appreciated that "real-time" processing may deliver faster results but could come at a cost of reduced accuracy. Furthermore, there may be a need for two copies of application logic because the programming models of a speed layer are different than those used in a batch layer.

Conventionally, Lambda architectures may be expensive to develop and expensive to deploy and manage in production. In some implementations, as more application like Internet of Things ("IoT"), require continuous processing, it may not be beneficial to use Lambda architectures and conventional style middleware. Therefore, there exists a need for a simpler approach to Lambda to process streaming application data.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular implementations of the specification, or any scope of the claims. Its sole purpose is to present some concepts of the specification in a simplified form as a prelude to the more detailed description that is presented in this disclosure.

In accordance with an aspect, streaming data operations can be received. Stream data operations can be packaged into a set of sequential frames. A metadata update transaction can be dynamically generated and associated with each frame in the sequential set of frames. A frame in the sequential set of frames can be asynchronously processed by validating the streaming operations of the frame against the metadata update transaction associated with the frame, serializing operations of the frame, sealing the frame, sealing the metadata update transaction associated with the frame, and sending the frame to tier 1 storage.

In accordance with another aspect, acknowledgement from tier 1 storage that frames in the set of sequential frame have been stored successfully can be asynchronously received. In response to receiving acknowledgement that a frame in the set of sequential frames was stored successfully, a sequential placement of the frame in the set of sequential frames can be determined. Any unprocessed metadata update transactions associated with the frame and frames in the set of sequential frames earlier than the sequential placement of the frame can be processed.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
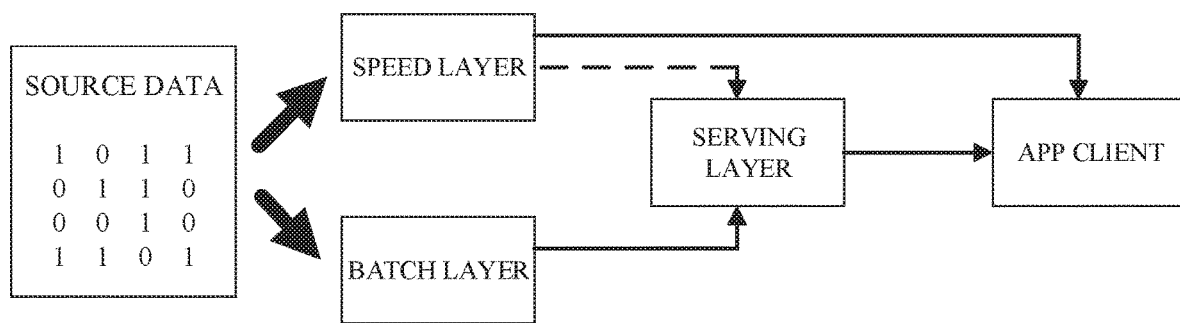
FIG. 1 illustrates an example illustration of a Lambda architecture for processing streaming application data.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

As used herein, the term "node" refers to a physical computing device, including, but not limited to, network devices, servers, processors, cloud architectures, or the like. In at least one of the various implementations, nodes may be arranged in a cluster interconnected by a high-bandwidth, low latency network backplane. In at least one of the various implementations, non-resident clients may communicate to the nodes in a cluster through high-latency, relatively low-bandwidth front side network connections, such as Ethernet, or the like.

As used herein, the terms "Stream" or "Pravega" refers to a new storage primitive. A stream is ideally suited to the continuous processing of unbounded data. In many implementations, a stream may be a name, durable, append-only and unbounded sequence of bytes. In most implementations, with this primitive, and with the key features discussed in this disclosure, the stream can be combined with stream processing engines such as Apache Flink to build streaming applications.

Implementations are provided herein for accepting operations asynchronously in a particular order and efficiently committing them into an append-only log while preserving relative order. Operations that are dependent on one or more operations prior to them in the log will be guaranteed to fail, and not accepted, if any of the prior operations failed. If an operation succeeds, it is guaranteed that all operations it depended on are also successful.

In one implementation, each operation in the system impacts one or more segments. Operations are things that can change a segment. For example, create a segment, delete a segment, append to a segment, seal a segment, or merge a segment into another segment. It can be appreciated that writing data to tier 1 storage takes the strong majority of the percentage of time to process an operation. Therefore, large amounts of small writes to tier 1 storage could likely cause a bottleneck. Thus, there exists a need to package writes into batches or frames to create less writes to write the same amount of data to Tier 1 storage.

Operations can be accepted into a system into an ordered queue that defines the absolute order in which a client wishes them executed. In one implementation, there can be a buffer or pre-processing queue that defines the absolute order in which the caller wishes the operations executed. It can be appreciated that when operations in the queue fail, the contents will be lost and the caller will need to re-send them. It can be further appreciated that what the caller actually wants is that operations that touch a particular segment or set of segments must be executed in the sequence provided, however for independent segments, there is no such restriction.

Each operations successful execution can update an internal global metadata store, and every subsequent operation can be validated against that metadata. For example, if a first operation appends data to a segment up to an offset of 100, and the next operation wants to write at offset 100, the first operation must be processed prior to the second operation for the operations to be properly serialized. If an operation fails to execute or cannot be serialized, all future operations that depend on the failed operation should fail too.

An operation's successful execution means it was durable stored in Tier 1 storage and is capable of being recovered after a system failure. It can be appreciated that if N (where N is an integer greater than 1) writes are sent in parallel, implementations provided herein can guarantee that such writes will be persisted and read back in the same over. It can also be appreciated that if a write in the sequence fails, all writes after the failed write in the sequence will also fail. It can further be appreciated that if a write in the sequence succeeds, all writes in the sequence prior to the successful write have also succeeded.

Referring now to FIG. 1, there is illustrated an example illustration of a Lambda architecture for processing streaming application data. In some prior implementations, in using a Lambda architecture, a developer may use a complex combination of middleware tools that include batch style middleware influenced by platforms like Apache Hadoop and continuous processing tools like Apache Storm, Apache Samza, Apache Kafka and others. Batch style processing can be used to deliver accurate but potentially out of data analysis of data. It can be appreciated that "real-time" processing may deliver faster results but could come at a cost of reduced accuracy. Furthermore, there may be a need for two copies of application logic because the programming models of a speed layer are different than those used in a batch layer. With duplicated storage and middleware in both the speed layer and the batch layer, it can be difficult to determine the source that has the actual source of correct real time data. Merging the logic of the speed layer and the batch layer in the serving layer that interfaces with the application client can also be challenging. Thus, conventionally, Lambda architectures may be expensive to develop and expensive to deploy and manage in production.

Figure 2:
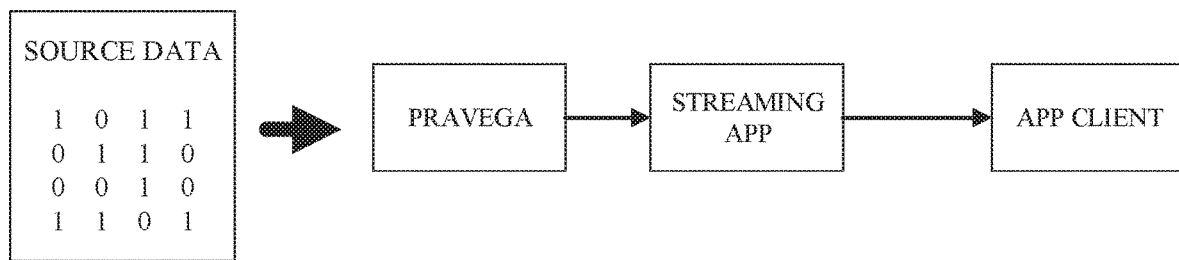
FIG. 2 illustrates an example illustration of a Pravega architecture for processing streaming application data in accordance with implementations of this disclosure.

FIG. 2 illustrates an example illustration of a Pravega architecture for processing streaming application data in accordance with implementations of this disclosure. In many implementations, there can be one set of middleware to deploy and operate. In some implementations, there can be one expression of application logic to develop and maintain rather than two. There can be one ingest process from the source data into Pravega. One source of truth for data can lie within Pravega. There can be one embodiment of application. There can be one set of middleware. It can be appreciated that this can create a more stable and a simpler to develop for application environment for the Application Client.

Figure 3:
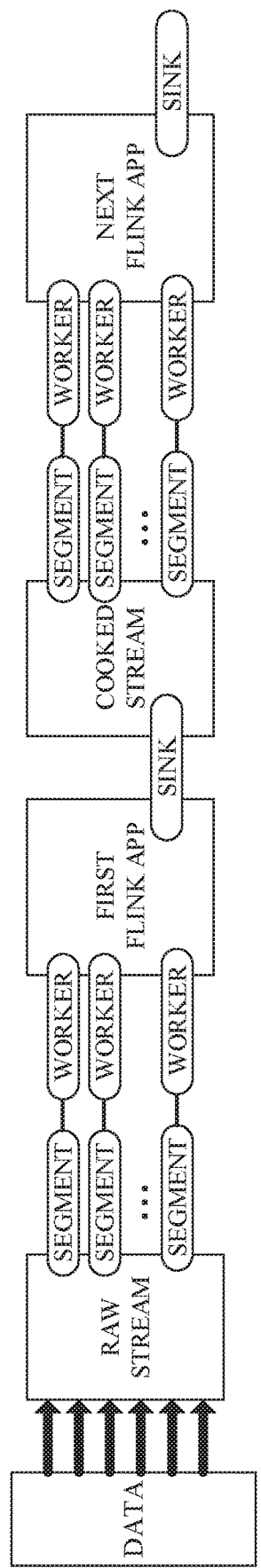
FIG. 3 illustrates an example of multiple individual applications or jobs in a streaming application data pipeline in accordance with implementations of this disclosure.

FIG. 3 illustrates an example of multiple individual applications or jobs in a streaming application data pipeline in accordance with implementations of this disclosure. It can be appreciated that in most implementations, most applications, including Internet of Things ("IoT") applications, involve a pipeline of several, often many more individual applications or jobs. IN some implementations, a Kappa environment may have requirements imposed on middleware in terms of chains of pipelines of data processing. For example, some requirements may involve end-end semantics in addition to component by component capabilities. In some implementations, the current disclosure considers scaling in terms of end-end scaling, in addition to scaling a single component. In certain implementations, the current disclosure considers ordering, exactly once delivery semantics, fault tolerance, etc., across the entire pipeline. In some implementations, the current disclosure can enable coordination of the output of one component with the input of a downstream component to deliver a pipeline of stream components more efficiently.

Exactly Once Semantics

In some implementations, exactly once semantics can mean the current disclosure can ensure that data is delivered and processed exactly once, with exact ordering guarantees, despite failures in clients, servers, or the network. In certain implementations, to achieve exactly once semantics, Pravega Streams may be durable, ordered, consistent and transactional.

In most implementations, ordering can mean that data is seen by readers in the order it is written. In some implementations of the current disclosure, data may be written along with an application-defined routing key. In certain implementations, the current disclosure may make ordering guarantees in terms of routing keys. In many implementations, two pieces of data with the same routing key may be read by a reader in the order they were written. In most implementations, the current disclosures may enable ordering guarantees allow data reads to be replayed (e.g. when applications crash) and the results of replaying the reads may be the same.

In most implementations, consistency may mean that Readers see the same ordered view of data for a given routing key, even in the face of failure. In most implementations, systems that are "mostly consistent" may not sufficient for building accurate data processing.

Conventionally, systems that provide "at least once" semantics may suffer from the possibility of data duplication. In typical systems, in certain failure scenarios, a data producer, upon recovery may write the same data twice. In most implementations of the current disclosure, writes may be idempotent, rewrites done as a result of failure recovery may not result in data duplication. In most implementations, it may not be possible to deliver exactly once processing semantics when there is the possibility of data duplication.

In certain implementations, techniques may extend beyond just exactly once semantics between two components within an application architecture, and may include end-end exactly once semantics across an entire pipeline of streaming application components with strict ordering of data in the face of component failures. In some implementations, data storage may be the foundation for once across an entire data processing pipeline. In many implementations, data storage may be important for building streaming applications that are both timely and accurate. In most implementations, without accuracy at the storage layer, application developers may be faced with relying on the complexity of a Lambda architecture to deliver accurate data analysis in combination with near real-time processing of the data.

Auto Scaling

Unlike systems with static partitioning, the current disclosure may automatically scale individual data streams to accommodate changes in data ingestion rate.

In a particular implementation, imagine an IoT application with millions of devices feeding thousands of data streams with information about those devices. In this implementation, imagine a pipeline of Flink jobs that process those streams to derive business value from all that raw IoT data: predicting device failures, optimizing service delivery through those devices, or tailoring a customer's experience when interacting with those devices. In this implementation, building such an application at scale is difficult without having the components be able to scale automatically as the rate of data increases and decreases.

Conversely, with implementations of the current disclosure, it may be easy to elastically and independently scale data ingestion, storage and processing—orchestrating the scaling of every component in a data pipeline. In many implementations, the current disclosure may support autoscaling starts with the idea that Streams are partitioned into Stream Segments. In most implementations, a Stream may have 1 or more Stream Segments, any data written into the Stream may be written to one of the Stream Segments based on a routing key. In certain implementations, writers may use application-meaningful routing keys like customer-id, timestamp, machine-id, so like data is grouped together.

In some implementations, a Stream Segment may be a fundamental unit of parallelism in Pravega Streams. In many implementations, a Stream with multiple Stream Segments may support more parallelism of data writes; multiple Writers writing data into the different Stream Segments potentially involving all the Pravega Servers in the cluster. In certain implementations, on the Reader side, the number of Stream Segments may represent the maximum degree of read parallelism possible. In certain implementations, if a Stream has N Stream Segments, then a ReaderGroup with N Readers may consume from the Stream in parallel. In most implementations, increasing the number of Stream Segments may increase a number of Readers in a ReaderGroup to increase the scale of processing the data from that Stream. In further implementations, as the number of Stream Segments decreases, the number of Readers may be reduced.

In some implementations, a Stream may be configured to grow the number of Stream Segments as more data is written to the Stream, and to shrink when data volume drops off. In certain implementations, growing and shrinking a stream may be referred to herein as the Stream's Service Level Objective or SLO. In many implementations, the current disclosure may enable monitoring a rate of data input to the Stream and uses the SLO to add or remove Stream Segments from a Stream. In certain implementations, segments may be added by splitting a Segment. In further implementations, segments may be removed by merging two Segments. In most implementations, the number of Stream Segments may vary over time.

In certain implementations, it may be possible to coordinate the auto scaling of Streams in Pravega with application scale out. In further implementations, using metadata available from Pravega, applications may configure the scaling of their application components. In a particular implementation, scaling may drive the number of instances of a Flink job. In another implementation, it may be possible to use software such as Cloud Foundry, Mesos/Marathon, Kubernetes or the Docker stack to deploy new instances of an application to react to increased parallelism at the Pravega level, or to terminate instances as Pravega scales down in response to reduced rate of data ingestion.

Distributed Computing Primitive

In most implementations, the current disclosure may enable efficient use of distributed applications, such as micro-services. In certain implementations, the current disclosure may enable data as a data storage mechanism, for messaging between micro-services and for other distributed computing services such as leader election.

In some implementations, a State Synchronizer may be a basis of sharing state across a cluster with consistency and optimistic concurrency. In further implementations, a State Synchronizer may be based on a fundamental conditional write operation, so that data may be written if it would appear at a given position in the Stream. In certain implementations, if a conditional write operation cannot meet the condition, it may fail. In certain implementations, a State Synchronizer may be a strong synchronization primitive that may be used for shared state in a cluster, membership management, leader election and other distributed computing scenarios.

Write Efficiency

In many implementations, the current disclosure may enable shrinking of write latency to milliseconds, and may seamlessly scale to handle high throughput reads and writes from thousands of concurrent clients, making it ideal for IoT and other time sensitive applications.

In implementations of the current disclosure, streams may be light weight, and implementations of the current disclosure may be able to support millions of Streams. In many implementations, the techniques of the current disclosure may free an application from worrying about statically configuring streams and pre allocating a small fixed number of streams and husbanding or limiting stream resource.

In many implementations, the current disclosure may enable low latency Write operations, for example, under 10 ms to return an acknowledgement to a Writer. In further implementations, writes may be optimized so that I/O throughput may be limited by network bandwidth rather than a persistence mechanism being the bottle neck. In certain implementations, Apache BookKeeper may be used to persist all write operations. In some implementations, BookKeeper may persist and protect the data very efficiently. In certain implementations, as data may be protected before the write operation is acknowledged to the Writer, data may be durable. In many implementations, data durability may be a fundamental characteristic of a storage primitive. In many implementations, to add further efficiency, writes to BookKeeper may often involve data from multiple Stream Segments, so the cost of persisting data to disk may be amortized over several write operations. In most implementations of the current disclosure, there may be no durability-performance trade-off as writes may be both durable and high performance.

In most implementations, reads may be efficient. In certain implementations, a reader may read from a Stream either at the tail of the Stream or at any part of the Stream's history. Unlike some log-based systems that use the same kind of storage for tail reads and writes as well as reads to historical data, implementations of the current disclosure may use two types of storage. In many implementations, a tail of a Stream may be in so-called Tier-1 storage. In most implementations, writes may be implemented by Apache BookKeeper as described herein. In certain implementations, tail reads may be served out of a managed memory cache. In fact, in some implementations BookKeeper may serve reads in failure recovery scenarios, for example, when a crash has occurred and the system is being recovered. In some implementations, the historical part of the Stream may be in Tier-2 storage that may be optimized for low cost storage with high throughput. In some implementations, Pravega may use efficient in-memory read ahead cache, taking advantage of the fact that Streams are usually read in large contiguous chunks and that HDFS is well suited for those sort of large, high throughput reads. In most implementations, tail reads may not impact the performance of writes.

Infinite Retention

In many implementations, data in Streams may be retained indefinitely. In most implementations, the current disclosure enables an API to access both real-time and historical data. In certain implementations, batch and real-time applications may be handled efficiently.

In some implementations, there may be a value to keeping old data. In some implementations, for example in machine learning, it may be desirable to periodically change the model and train the new version of the model against as much historical data as possible to yield a more accurate predictive power of the model. In many implementations, the current disclosure has auto-tiering and enables keeping historical data that does not affect the performance of tail reads and writes.

In many implementations, the size of a stream may not be limited by the storage capacity of a single server, but rather, may be limited by the storage capacity of a data center or a cloud provider. In further implementations, as cost of storage decreases, the economic incentive to delete data may go away.

Storage Efficiency

In many implementations, the current disclosure enables building pipelines of data processing, combining batch, real-time and other applications without duplicating data for every step of the pipeline.

Figure 4:
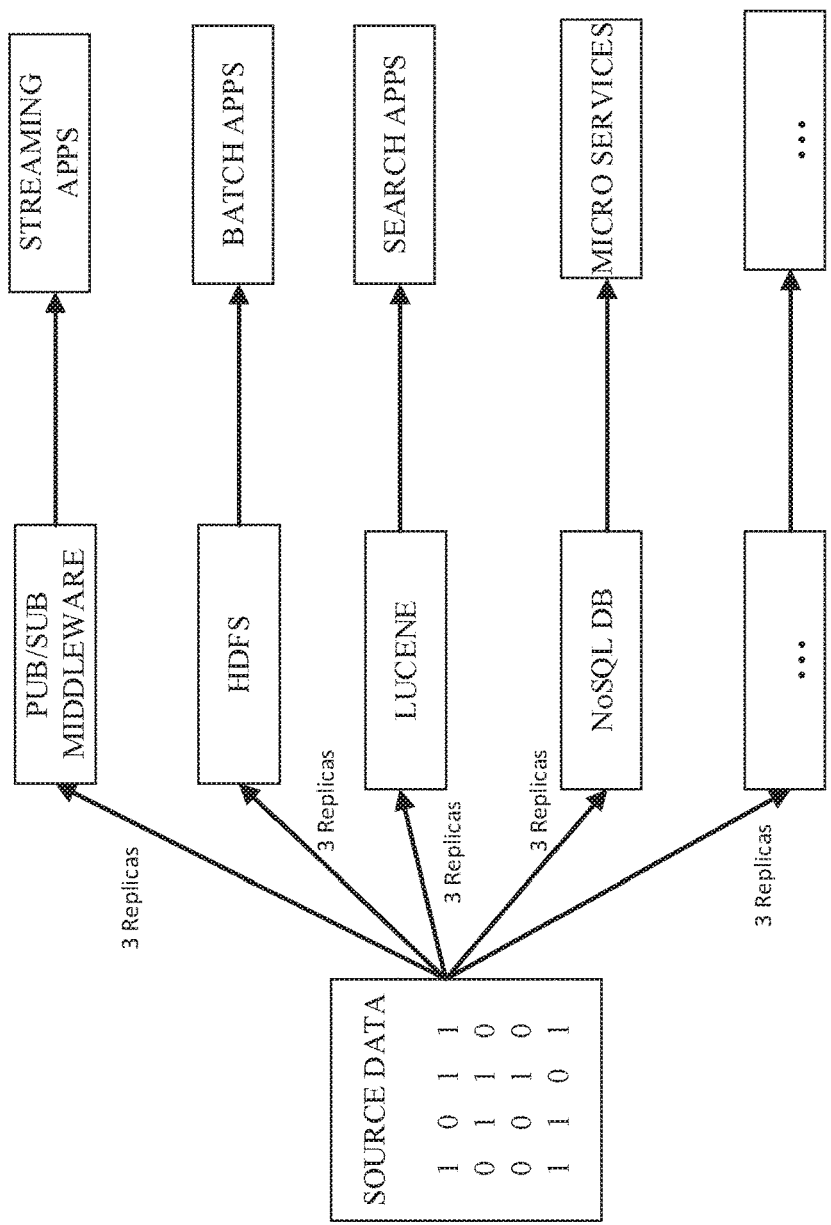
FIG. 4 illustrates an example data processing environment for processing streaming application data in a conventional system.

FIG. 4 illustrates an example data processing environment for processing streaming application data in a conventional system. Consider a data processing environment as depicted that combines real time processing using Spark, Flink, and or Storm; Hadoop Distributed File System ("HDFS") for batch processing; some kind of Lucene-based Search mechanism like Elastic Search for full text search; and maybe one (or several) NoSQL databases to support micro-services apps.

Using traditional approaches, one set of source data, for example sensor data from an IoT app, would be ingested and replicated separately by each system. Conventionally there would be with 3 replica copies of the data protected in the pub/sub middleware system, 3 copies of the data in HDFS, 3 copies of the data in Lucene, 3 copies of the data in the NoSQL database, and potential 3 copies of the data in other support services desirable to the system. When we consider the source data is measured in terabytes, the cost of data replication separated by middleware category becomes prohibitively expensive.

Figure 5:
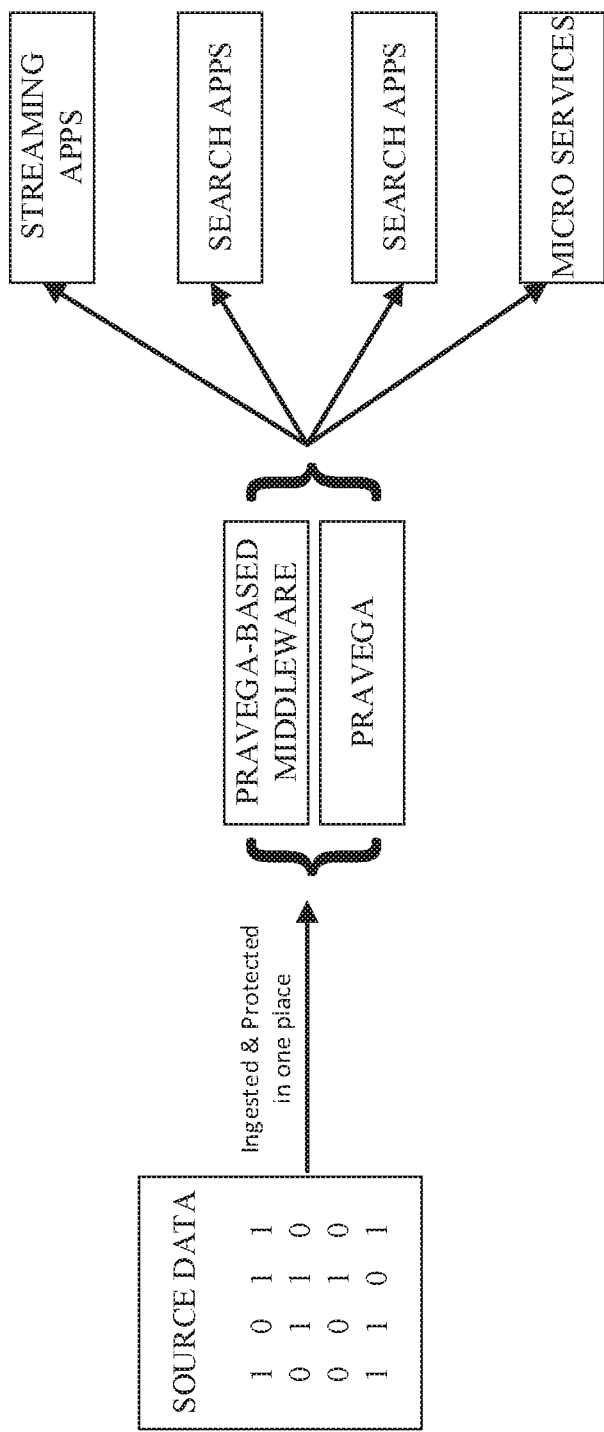
FIG. 5 illustrates an example data processing environment for processing streaming application data in accordance with implementations of this disclosure.

FIG. 5 illustrates an example data processing environment for processing streaming application data in accordance with implementations of this disclosure. In this implementation, consider the same pipeline from FIG. 4 using techniques of the current disclosure and middleware adapted to use techniques of the current disclosure for its storage.

In implementations of the current disclosure, there may be a single source of truth for data processing. In many implementations, with tier 2 storage, and features like erasure coding, 1 TB of data may be protected using less than 2 TB of storage. In further implementations, data may be ingested and protected in one place. Implementations of the current disclosure enable one place for storage and may provide a single source of truth for the entire pipeline. In further implementations, if the bulk of the data being stored in Tier-2 locations that are enabled with erasure coding to efficiently protect the data, the storage cost of the data may be substantially reduced.

Durability

In some implementations, there may not be compromise between performance, durability and consistency. In many implementations, the current disclosure may enable durable storage of streaming data with strong consistency, ordering guarantees and great performance. In most implementations, durability may be a fundamental storage primitive requirement. Conventionally, storage that could lose data is not reliable storage. Usually, systems based on storage can lose data may not be production quality.

In some implementations, once a write operation is acknowledged, data of the write may not be lost, even when failures occur. In many implementations, data may not be lost as data may be saved in protected, persistent storage before the write operation returns to the Writer. In most implementations, data in a Stream may be protected. In many implementations, a Stream may be treated as a system of record, similar to databases or files.

Transaction Support

In many implementations, the current disclosure may ensure that a set of events are written to a stream atomically.

In some implementations, a Pravega Transaction may be part of a Pravega's writer API. In certain implementations, data may be written to a Stream through the API, or an application may write data through a Transaction. In some implementations, with Transactions, a Writer may persist data at a one point in time, and later decide whether the data should be appended to a Stream or abandoned.

In many implementations, using a Transaction, data may be written to a Stream when the Transaction is committed. In most implementations, when a Transaction is committed, data written to the Transaction may be atomically appended to the Stream. In many implementations, as Transactions may be implemented in the same way as Stream Segments, data written to a Transaction is just as durable as data written directly to a Stream. In certain implementations, if a Transaction is abandoned (e.g. if the writer crashes) the Transaction may be aborted and all data may be discarded. In some implementations, an application may choose to abort the Transaction through the API if a condition occurs that suggests the writer should discard the data.

In many implementations, transactions may enable chaining Flink jobs together. In some implementations, when a Flink job uses Pravega as a sink, it may begin a Transaction, and if it successfully finishes processing, it may commit the Transaction, writing the data into a based sink. In some implementations, if the job fails a Transaction may time out and data may not be written. In some implementations, when a job is restarted, there may be no "partial result" in a sink that may need to be managed or cleaned up.

In some implementations, by combining Transactions, it may be possible to chain Flink jobs together, having one job's Pravega-based sink be the source for a downstream Flink job. In some implementations, the current disclosure may provide the ability for a pipeline of Flink jobs to have end-end exactly once, guaranteed ordering of data processing.

In some implementations, it may be possible for Transactions across multiple Streams to be coordinated with Transactions, so that a Flink job may use 2 or more Pravega-based sinks to provide source input to downstream Flink jobs. In additional implementations, it may be possible for application logic to coordinate Pravega Transactions with external databases such as Flink's checkpoint store.

Example Distributed System

Figure 6:
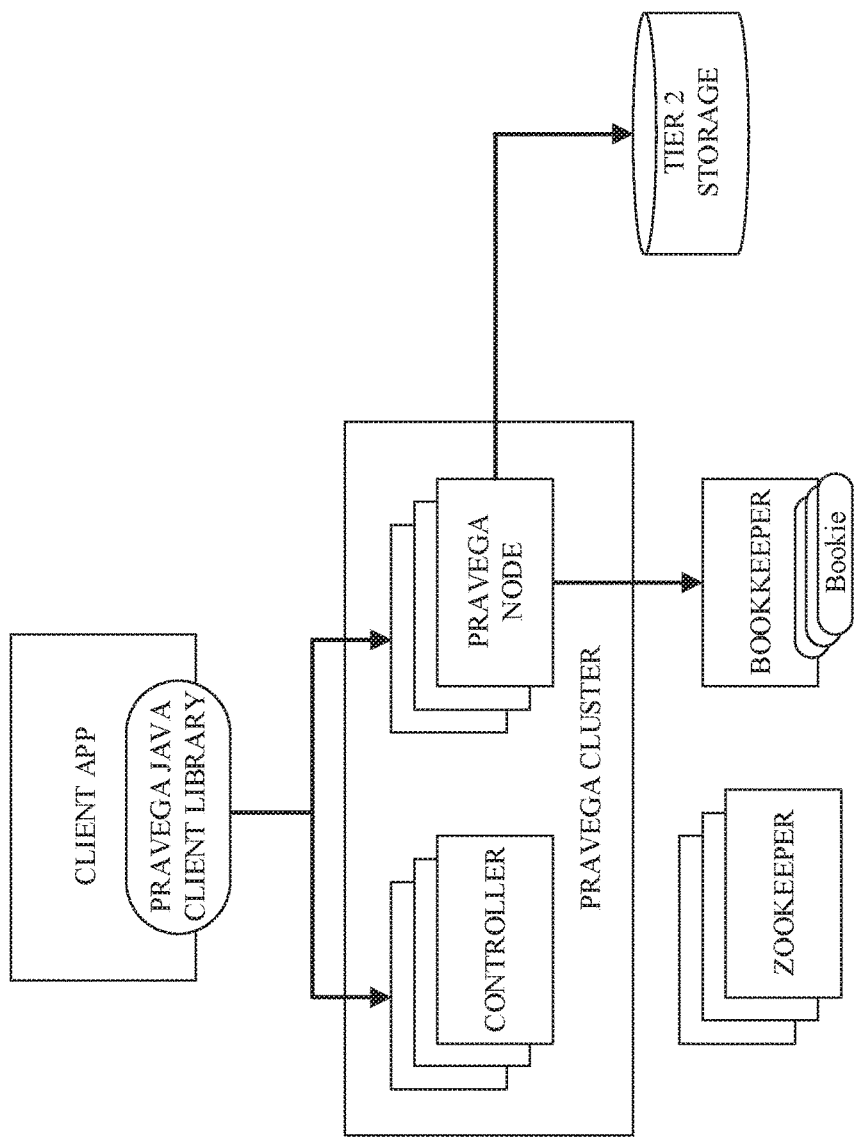
FIG. 6 illustrates an example Pravega Cluster in accordance with implementations of this disclosure.

FIG. 6 illustrates an example Pravega Cluster in accordance with implementations of this disclosure. Implementations of the current disclosure may be deployed as a distributed system. In a particular implementation, there may be a cluster of servers and storage coordinated to run Pravega called a "Pravega cluster." In some implementations, implementations of the current disclosure may be composed of two kinds of workload: Controller instances and Pravega Nodes.

In some implementations, a set of Controller instances may make up a control plane, which may provide functionality to create, alter and delete Streams, retrieve information about Streams, monitor the health of a Pravega cluster, gather metrics etc. In most implementations, there may be multiple (recommended at least 3) Controller instances running in a cluster for high availability.

In some implementations, a set of Pravega Nodes in a cluster may comprise a data plane or Pravega data plane. In many implementations servers, or Pravega Nodes, may provide an API to read and write data in Streams. In certain implementations, data storage may be comprised of two tiers: Tier 1 Storage, which provides short term, low-latency, data storage, guaranteeing the durability of data written to Streams and Tier 2 Storage providing longer term storage of Stream data. In certain implementations, Apache Bookkeeper may be used to implement Tier 1 Storage and can use HDFS, DellEMC's Isilon OneFS or DellEMC's Elastic Cloud Storage (ECS) to implement Tier 2 Storage. In some implementations, Tier 1 Storage may run within a Pravega cluster. In most implementations, Tier 2 Storage may be deployed outside the Pravega cluster.

In many implementations, tiering storage may be important to deliver the combination of fast access to Stream data but also allow Streams to store a vast amount of data. In some implementations, Tier 1 storage may persist the most recently written Stream data. In some implementations, as data in Tier 1 Storage ages, it may be moved into Tier 2 Storage.

Implementations of the current disclosure may use Apache Zookeeper as a coordination mechanism for the components in the Pravega cluster. In other implementations, other components, including Pravega components such as BookKeeper may rely on Zookeeper.

In some implementations, the current disclosure may provide a client library, written in Java, for building client-side applications such as analytics applications using Flink. In some implementations herein, a client library may be referred to as a Pravega client library. In certain implementations, a Pravega Java Client Library may manage the interaction between application code and Pravega via a custom TCP wire protocol.

Streams

In certain implementations, the current disclosure may organize data into Streams. In most implementations, a stream may be a persistent, unbounded, append-only collection of data records called Events. In some implementations herein, a stream may be referred to as a Pravega Stream.

In certain implementations, a Pravega Stream may be based on an append-only log data structure. In some implementations, by using append-only logs, the current implementation enable rapid ingestion of information into durable storage, and support a large variety of application use cases such as publish/subscribe messaging similar to Apache Kafka, NoSQL databases such as a Time Series Database (TSDB), workflow engines, event-oriented applications and many other kinds of applications.

In some implementations, when a Stream is created, the Stream may be given a meaningful name such as "IoTSensorData" or "WebApplicationLog_201 7-03-30T13:08:10." In certain implementations, a Stream's name may help other developers understand the kind of data that is stored in the Stream. In most implementations, a Pravega Stream names may be organized within a Scope. In most implementations, a Scope may be a string and may convey some sort of meaning to developers such as "FactoryMachines" or "HR_Website_logs." In some implementations, a Scope may act as a namespace for Stream names. Stream names can be unique within a Scope.

In many implementations, a Stream may be uniquely identified by a combination of its Stream Name and Scope. In certain implementations, Scope may be used to segregate names by tenant (in a multi tenant environment), by department of an organization, by geographic location or any other categorization the developer chooses.

In some implementations, a Stream may be unbounded in size. In many implementations, there may not be a limit on how many Events can be in a Stream or how many total bytes are stored in a Stream. In most implementations, Pravega may be a data storage primitive. In certain implementations, the amount of data stored in Pravega may be limited by the total storage capacity of the data center. In most implementations, once data is written to it, it may be durably stored.

In some implementations, to deal with a potentially large amount of data within a Stream, Pravega Streams may be divided into Stream Segments. In certain implementations, a Stream Segment may be a shard, or partition of the data within a Stream.

Events

In many implementations, a primitive data element in Pravega may be an Event. In some implementations, an Event may be a collection of bytes within a Stream. In certain implementations, an Event may be as simple as a small number of bytes containing a temperature reading from an IoT sensor composed of a timestamp, a metric identifier and a value. In some implementations, an event may be web data associated with a user click on a website. In certain implementations, an event may be anything you can represent as a collection of bytes. In many implementations, applications may make sense of Events using standard Java serializers and deserializers, allowing them to read and write objects in Pravega using similar techniques to reading and writing objects from file-based storage.

In most implementations, an Event may have a Routing Key. In certain implementations, a Routing Key may be a String that allows Pravega and application developers to determine which Events are related. In further implementations, a Routing Key may be a string that developers use to group similar Events together. In certain implementations, a Routing Key may be derived from data naturally occurring in an Event, something like "customer-id" or "machine-id", but it may also be some artificial String such as a UUID or a monotonically increasing number. In many implementations, a Routing Key may be something like a timestamp (to group Events together by time) or perhaps a Routing Key could be an IoT sensor id (to group Events by machine). In certain implementations, a Routing Key may be important to defining precise read and write semantics.

Readers, Writers and ReaderGroups

Figure 7:
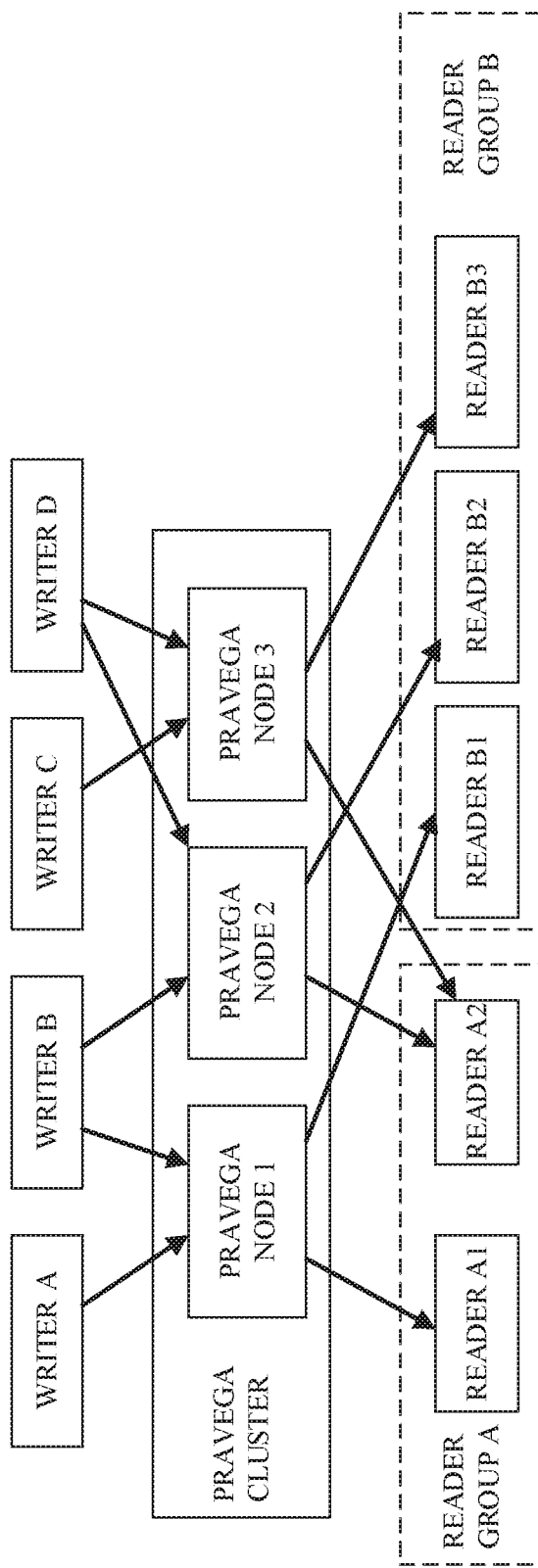
FIG. 7 illustrates an example Pravega Cluster ingesting data from a set of writers and making data available to a set of reader groups in accordance with implementations of this disclosure.

FIG. 7 illustrates an example Pravega Cluster ingesting data from a set of writers and making data available to a set of reader groups in accordance with implementations of this disclosure. In some implementations, the current disclosure provides for a client library, written in Java that may implement a convenient API for Writer and Reader applications to use. In some implementations, a Pravega Java Client Library may encapsulate a wire protocol used to communicate between Pravega clients and Pravega.

In some implementations, a Writer may be an application that creates Events and writes them into a Stream. In most implementations, data may be written by appending to the tail (front) of a Stream.

In certain implementations, a Reader may be an application that reads Events from a Stream. In many implementations, a Reader may read from any point in the Stream. In certain implementations, a Reader may be reading Events from the tail of the Stream. In certain implementations, Events may be delivered to Readers as quickly as possible. For example, in one implementation, Events can be delivered to Readers within tens of milliseconds after they were written. In further implementations, Readers may read from earlier parts of the Stream (called catch-up reads). In certain implementations, a Position may represent point in a Stream a Reader is currently located. In some implementations, a Position object may be used as a recovery mechanism—applications that persist the last Position a Reader has successfully processed can use that information to initialize a replacement Reader to pickup where a failed Reader left off. In certain implementations, using this pattern of persisting Position objects, an application may be built that guarantees exactly once Event processing in the face of Reader failure.

In some implementations, Readers may be organized into ReaderGroups. In many implementations, a ReaderGroup may be a named collection of Readers that together, in parallel, read Events from a given Stream. In certain implementations, when a Reader is created through the Pravega data plane API, the name of the ReaderGroup may be part of it. In certain implementations, each Event published to a Stream may be guaranteed to be sent to one Reader within the ReaderGroup. In many implementations, there may be one Reader in the ReaderGroup or there may be many. In further implementations, there may be many different ReaderGroups simultaneously reading from any given Stream.

In certain implementations, ReaderGroup may be a "composite Reader" or a "distributed Reader", that allows a distributed application to read and process Stream data in parallel, such that a massive amount of Stream data can be consumed by a coordinated fleet of Readers in a ReaderGroup. In some implementations, a collection of Flink tasks processing Stream data in parallel may be an example use of a ReaderGroup.

Stream Segments

Figure 8:
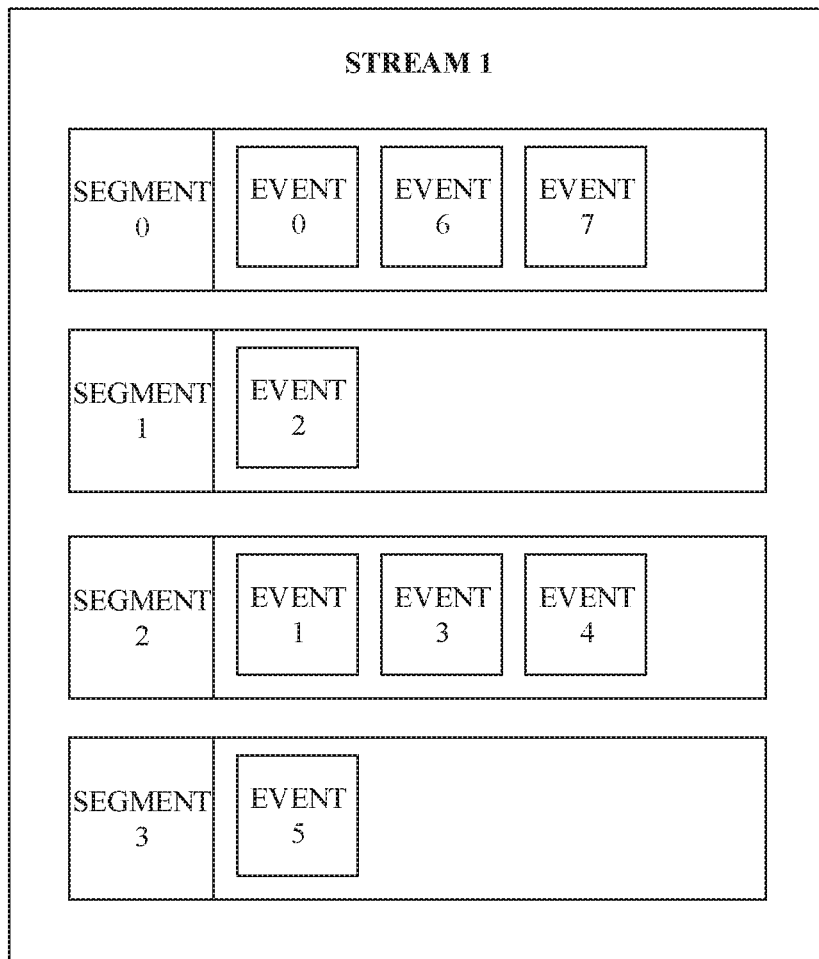
FIG. 8 illustrates an example Stream decomposed into a set of Stream Segments in accordance with implementations of this disclosure.

FIG. 8 illustrates an example Stream decomposed into a set of Stream Segments in accordance with implementations of this disclosure. In many implementations, a Stream may be decomposed into a set of Stream Segments. A Stream Segment is a shard or partition of a Stream. In many implementations, an Event may be Stored within a Stream Segment In some implementations, a Stream Segment may be a container for Events within the Stream. In certain implementations, when an Event is written into a Stream, it may be stored in one of the Stream Segments based on the Event's Routing Key. In certain implementations, consistent hashing may be used to assign Events to Stream Segments. In certain implementations, event Routing Keys may be hashed to form a "key space." In some implementations, key space may be divided into a number of partitions, corresponding to the number of Stream Segments. In some implementations, consistent hashing may determine which Segment an Event may be assigned to.

Auto Scaling Stream Segments

In some implementations, AutoScaling may refer to a number of Stream Segments that vary over time. In some implementations, a number of Stream Segments in a Stream may grow and shrink over time as I/O load on the Stream increases and decreases, which may be referred to herein as AutoScaling.

Figure 9:
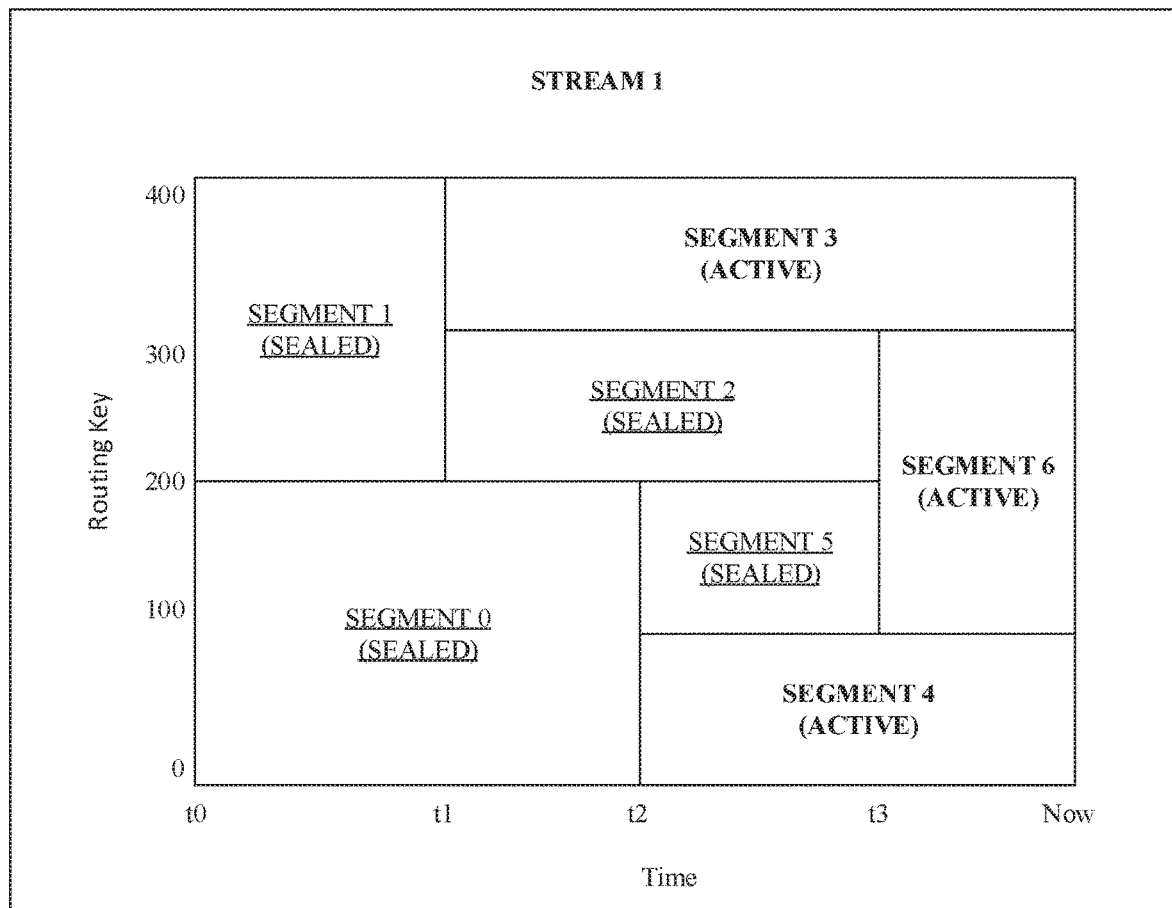
FIG. 9 illustrates an example graph depicting the relationship between routing keys, stream segments, and time in accordance with implementations of this disclosure.

FIG. 9 illustrates an example graph depicting the relationship between routing keys, stream segments, and time in accordance with implementations of this disclosure. In this example implementation, a Stream starts out at time $t_0$ with a configurable number of Segments. If the rate of data written to the Stream is constant, the number of Segments won't change. However at time t1, the system noted an increase in the ingestion rate and chose to split Segment 1 into two parts. We call this a Scale-up Event. Before t1, Events with a Routing Key that hashes to the upper part of the key space (values 200-399) would be placed in Segment 1 and those that hash into the lower part of the key space (values 0-199) would be placed in Segment 0. After t1, Segment 1 is split into Segment 2 and Segment 3. Segment 1 is sealed and it no longer accepts writes. At this point in time, Events with Routing Key 300 and above are written to Segment 3 and those between 200 and 299 would be written into Segment 2. Segment 0 still keeps accepting the same range of Events as before t1.

In this implementation, there is another Scale-up Event at time $t_2$ as Segment 0's range of Routing Key is split into Segment 5 & Segment 4. Also at this time, Segment 0 is sealed off so that it accepts no further writes. Segments covering a contiguous range of the key space can also be merged. At time t3, Segment 2's range and Segment 5's range are merged into Segment 6 to accommodate a decrease in load on the Stream.

In some implementations, when a Stream is created, it may be configured with a Scaling Policy that determines how a Stream reacts to changes in its load.

In certain implementation, there may be one or more of the following Scaling Policies. (1) Fixed—The number of Stream Segments may not vary with load. (2) Size-based—As the number of bytes of data per second written to the Stream increases past a certain target rate, the number of Stream Segments may be increased. If it falls below a certain level, the number of Stream Segments may be decreased. (3) Event-based—Similar to Size-based Scaling Policy, except it may use the number of Events instead of the number of bytes.

Events, Stream Segments and Autoscaling

Figure 10:
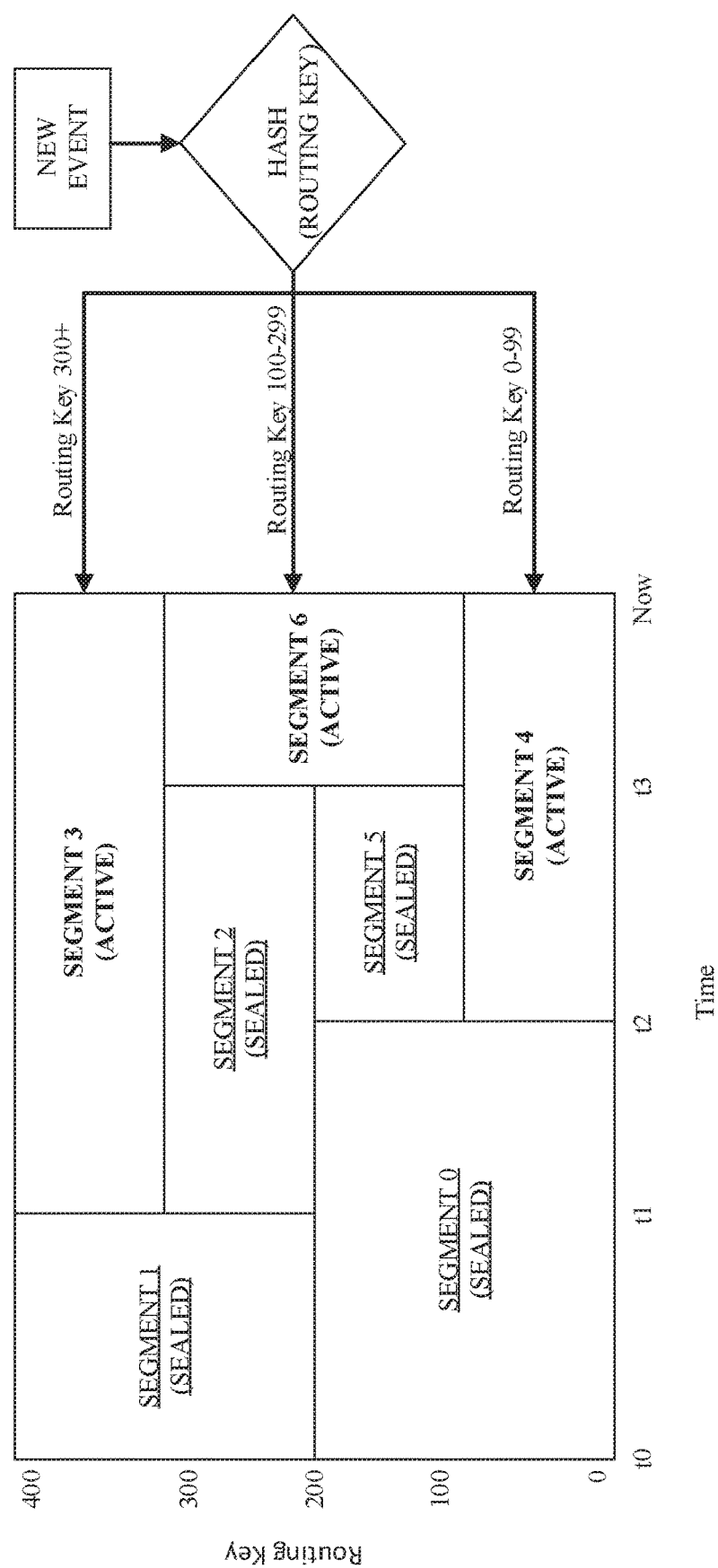
FIG. 10 illustrates an example graph depicting Events and their relationship between routing keys, stream segments, and time in accordance with implementations of this disclosure.

FIG. 10 illustrates an example graph depicting Events and their relationship between routing keys, stream segments, and time in accordance with implementations of this disclosure. In some implementations, an Event may be written into one of the Stream's Segments. In some implementations, Stream Segments may be a bucketing of Events based on Routing Key and time. In many implementations, Events published to a Stream within a given value of Routing Key may appear in the same Stream Segment.

In some implementations, Events may be written into the active Stream Segments. In many implementations, Segments that are sealed may not accept writes. In FIG. 10, at time "now", Stream Segments 3, 6 and 4 are active and between those three Stream Segments the entire key space is covered.

Stream Segments and Reader Groups

Figure 11:
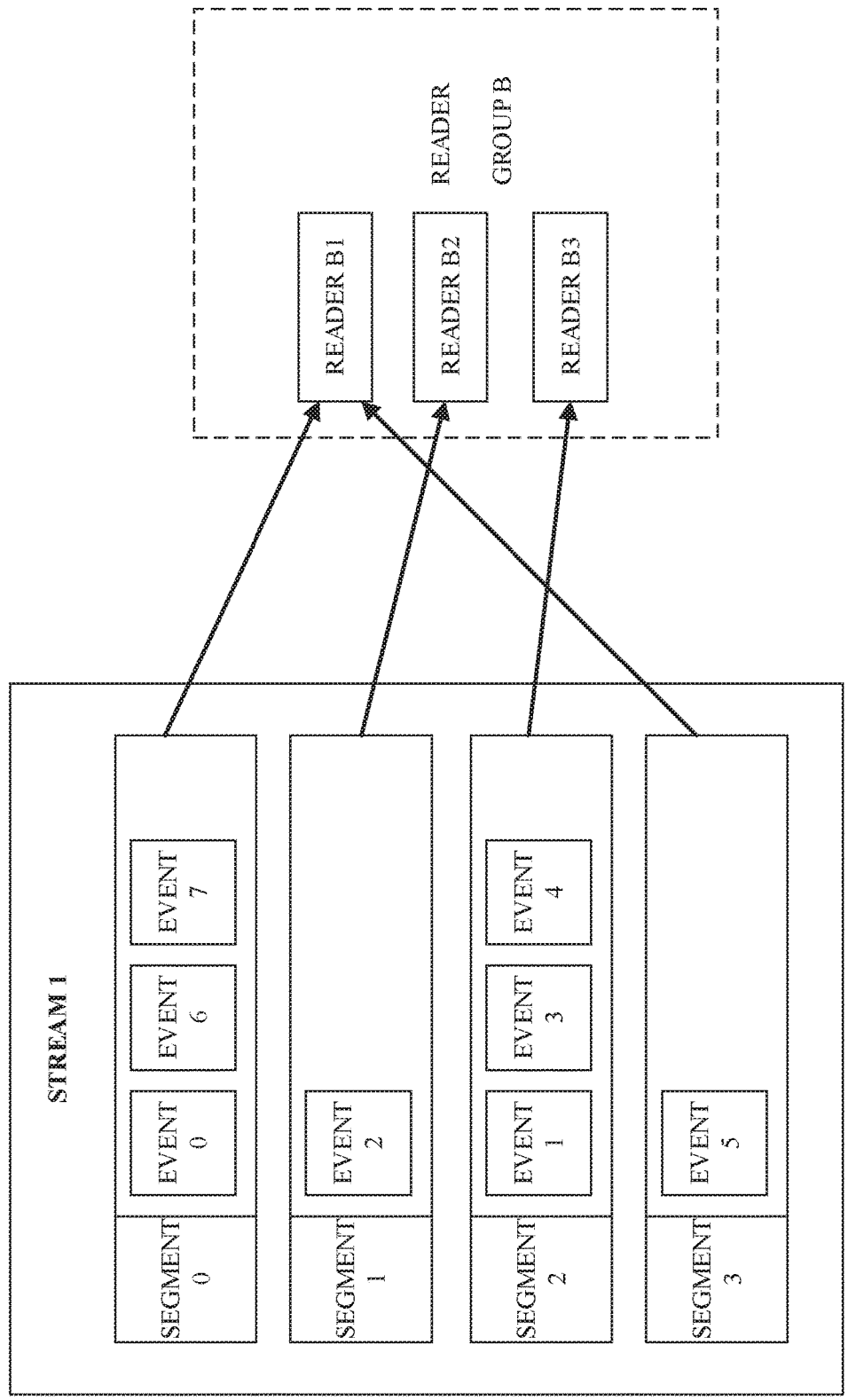
FIG. 11 illustrates an example of Stream Segments and associated ReaderGroups in accordance with implementations of this disclosure.

FIG. 11 illustrates an example of Stream Segments and associated ReaderGroups in accordance with implementations of this disclosure. In certain implementations, a Reader in a ReaderGroup may be assigned zero or more Stream Segments from which to read. In many implementations, the number of Stream Segments may be balanced to which Reader it is assigned. In FIG. 11, Reader B1 reads from 2 Stream Segments while each of the other Readers in the Reader Group have only 1 Stream Segment to read from. In certain implementations, each Stream Segment may be read by one Reader in any ReaderGroup configured to read from that Stream. In many implementations, Readers may be added to the ReaderGroup, or Readers crash and may be removed from the ReaderGroup. In many implementations Stream Segments so that Stream Segments may be reassigned to be balanced amongst the Readers.

In some implementations, a number of Stream Segments in a Stream may determine the upper bound of parallelism of readers within a ReaderGroup. In many implementations, the more Stream Segments, the more separate, parallel sets of Readers may consume a Stream. In FIG. 11, Stream 1 has 4 Stream Segments. That means that the largest effective Reader Group would contain 4 Readers. Reader Group named "B" in the above figure is not quite optimal. If one more Reader was added to the ReaderGroup, each Reader would have 1 Stream Segment to process, maximizing read parallelism. However, the number of Readers in the ReaderGroup increases beyond 4, at least one of the Readers will not be assigned a Stream Segment. If Stream 1 in the example implementation above experienced a Scale-Down Event, reducing the number of Stream Segments to 3, then Reader Group B as depicted would have an ideal number of Readers.

In some implementations, an Auto Scaling feature may enable dynamically determining the right size of a Stream. In most implementations, Pravega Streams may grow and shrink to match the behavior of the data input. In most implementations, a size of any Stream may be limited by the total storage capacity made available to the Pravega cluster. In many implementations, if bigger streams are needed, more storage may be added to a cluster.

In certain implementations, applications may be made aware of changes in a Stream's Segments. In some implementations, the current disclosure may provide hooks to allow applications to react to changes in the number of Segments in a Stream, adjusting the number of Readers within a ReaderGroup, to maintain optimal read parallelism if resources allow. In certain implementations, this may enable a Flink application to increase or decrease the number of task instances that are processing a Stream in parallel, as scale events occur over time.

In certain implementations, the current disclosure may enable: (1) Events with the same Routing Key are consumed in the order they were written; (2) Events with different Routing Keys sent to a specific Reader will always be seen in the same order even if the Reader backs up and re-reads them; and (3) If there are multiple Readers reading a Stream and they all backup and replay the Stream, they will each see the same Events in the same order each time.

ReaderGroup Checkpoints

In certain implementations, the current disclosure may enable ability an application to initiate a Checkpoint on a ReaderGroup. In many implementations, a Checkpoint may create a consistent "point in time" persistence of the state of each Reader in the ReaderGroup, by using a specialized Event (a Checkpoint Event) to signal each Reader to preserve its state. In certain implementations, once a Checkpoint has been completed, the application may use the Checkpoint to reset all the Readers in the ReaderGroup to the known consistent state represented by the Checkpoint.

Transactions

Figure 12:
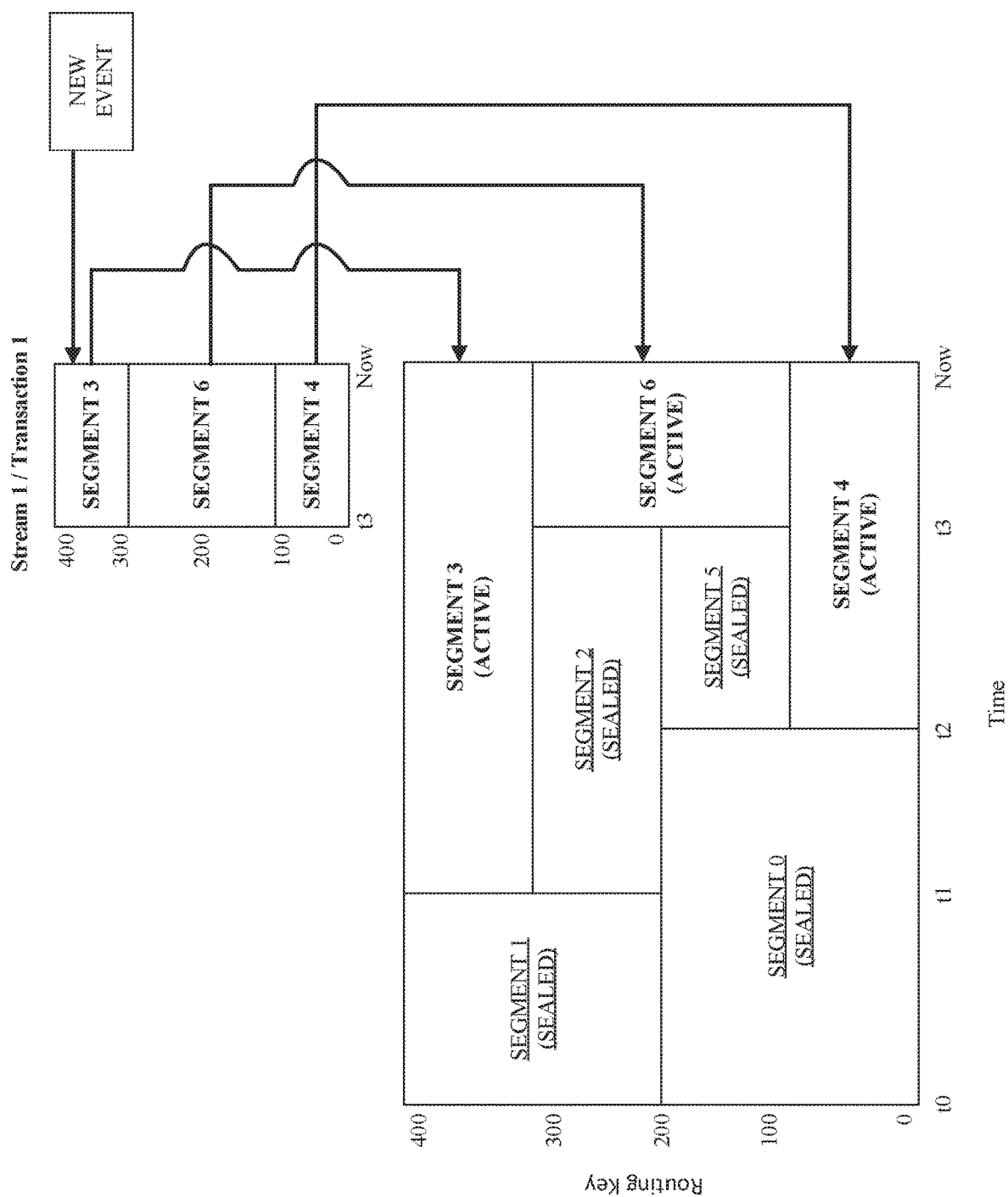
FIG. 12 illustrates an example graph depicting Events published into a Transaction and their relationship between routing keys, stream segments, and time in accordance with implementations of this disclosure.

FIG. 12 illustrates an example graph depicting Events published into a Transaction and their relationship between routing keys, stream segments, and time in accordance with implementations of this disclosure. In certain implementation, Pravega may support Transactions. In some implementation, a Transaction may "batch" up a bunch of Events and commit them as a unit into a Stream. In certain implementations, a Flink job may continuously produce results of some data processing and use the Transaction to durably accumulate the results of the processing. In certain implementations, at the end of a time window (for example) the Flink job may commit the Transaction and therefore may make the results of the processing available for downstream processing, or in the case of an error, abort the Transaction and the results disappear.

In certain implementations, a difference between Pravega's Transactions and similar approaches (such as Kafka's producer-side batching) is related to durability. Events added to a Transaction are durable when the Event is ack'd back to the Writer. However, the Events in the Transaction are not visible to readers until the Transaction is committed by the Writer. A Transaction is a lot like a Stream; a Transaction is associated with multiple Stream Segments. When an Event is published into a Transaction, the Event itself is appended to a Stream Segment of the Transaction. Say a Stream had 5 Segments, when a Transaction is created on that Stream, conceptually that Transaction also has 5 Segments. When an Event is published into the Transaction, it is routed to the same numbered Segment as if it were published to the Stream itself (if the Event would have been placed in Segment 3 in the "real" Stream, then it will appear in Segment 3 of the Transaction). When the Transaction is committed, each of the Transaction's Segments is automatically appended to the corresponding Segment in the real Stream. If the Stream is aborted, the Transaction, all its Segments and all the Events published into the Transaction are removed from Pravega.

In certain implementations, events published into a Transaction may not be visible to the Reader until that transaction is committed.

State Synchronizers

Figure 13:
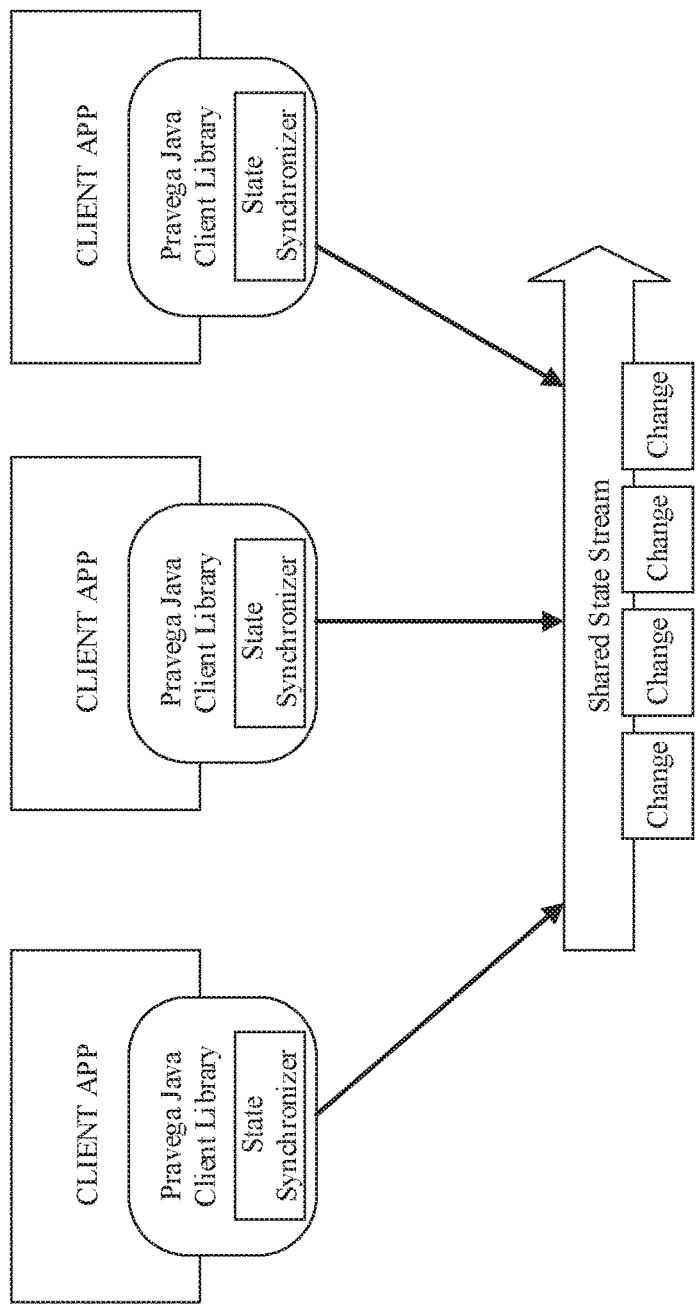
FIG. 13 illustrates an example state synchronizer in accordance with implementations of this disclosure.

FIG. 13 illustrates an example state synchronizer in accordance with implementations of this disclosure. In many implementations, Pravega may be a streaming storage primitive. In certain implementations, the current disclosure may provide a mechanism to coordinate processes in a distributed computing environment. In certain implementations, a State Synchronizer feature of Pravega may fall into the latter category.

In certain implementation, a State Synchronizer may use a Pravega Stream to provide a synchronization mechanism for state shared between multiple processes running in a cluster, making it easier to build distributed applications. In most implementations, with a State Synchronizer, the current disclosure may enable reads and changes to be made to shared state with consistency and optimistic locking.

In certain implementations, a State Synchronizer may be used to maintain a single, shared copy of an application's configuration property across all instances of that application in a cloud. In some implementations, a State Synchronizer may be used to store one piece of data or a map with thousands of different key value pairs. In some implementations, a State Synchronizer may be used to manage a state of ReaderGroups and Readers distributed throughout the network.

In some implementation, a State Synchronizer may be created on a Stream in a fashion similar to how an Event-Writer is created. In many implementations, a State Synchronizer may keep a local copy of the shared state to make access to the data really fast for the application. In certain implementations, changes to shared state may be written through the State Synchronizer to the Stream keeping track of all changes to the shared state. In some implementations, each application instance may use a State Synchronizer to stay up to date with changes by pulling updates to shared state and modifying the local copy of the data. In many implementations, consistency may be maintained through a conditional append style of updates to the shared state through the State Synchronizer, making sure that updates are made only to the most recent version of the shared state.

In many implementations, a State Synchronizer may occasionally be "compacted", compressing and removing old state updates so that only the most recent version of the state is kept in the backing stream. In certain implementations, a compacting feature may help app developers make sure that shared state does not grow unchecked.

In some implementations, a State Synchronizer may work best when most updates to shared state are small in comparison to the total data size being stored, allowing them to be written as small deltas. In many implementations, as with any optimistic concurrency system, a State Synchronizer may not be at its best when many processes are all attempting to simultaneously update the same piece of data.

Example Component Level Implementation

Figure 14:
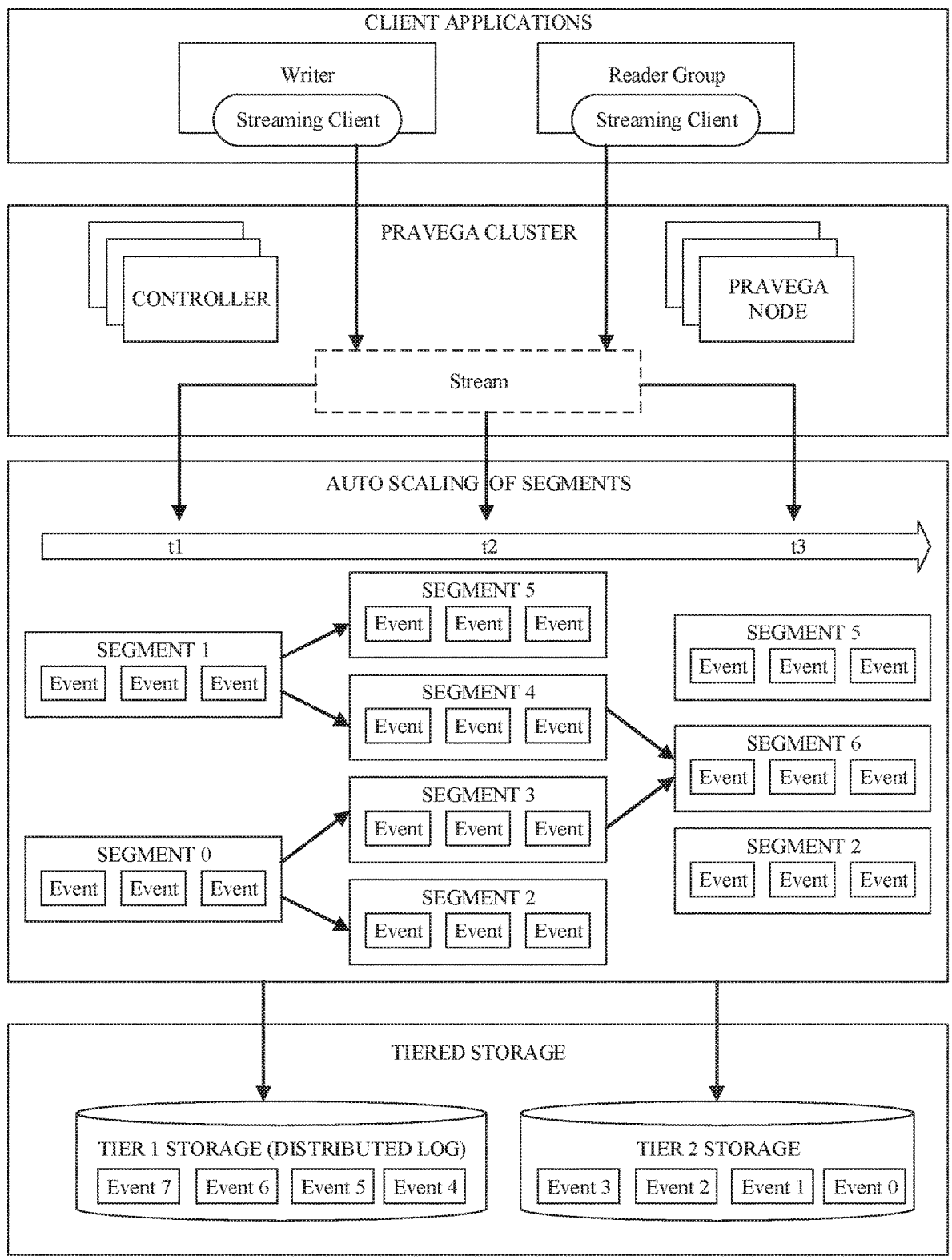
FIG. 14 illustrates an example implementation of a set of streaming clients, a Pravega Cluster, the autoscaling of segments, and tiered storage in accordance with implementations of this disclosure.

FIG. 14 illustrates an example implementation of a set of streaming clients, a Pravega Cluster, the autoscaling of segments, and tiered storage in accordance with implementations of this disclosure.

Pravega clients are Writers and Readers. Writers write Events into a Stream. Readers read Events from a Stream. Readers are grouped into ReaderGroups to read from a Stream in parallel.

The Controller is a server-side component that manages the control plane of Pravega. Streams are created, updated and listed using the Controller API.

The Pravega Server or Pravega Node is a server-side component that implements read, write and other data plane operations.

Streams are the fundamental storage primitive in Pravega. Streams contain a set of data elements called Events. Events are appended to the "tail" of the Stream by Writers. Readers can read Events from anywhere in the Stream.

A Stream is partitioned into a set of Stream Segments. The number of Stream Segments in a Stream can change over time. Events are written into exactly one of the Stream Segments based on Routing Key. For any ReaderGroup reading a Stream, each Stream Segment is assigned to one Reader in that ReaderGroup.

Each Stream Segment is stored in a combination of Tier1 and Tier2 storage. The tail of the Segment is stored in Tier1 providing low latency reads and writes. The rest of the Segment is stored in Tier2, providing high throughput read access with near-infinite scale and low cost.

In many implementations, to deliver an efficient implementation of Streams, the current disclosure may include a tiered storage model. In many implementations, events may be persisted in low latency/high IOPS storage (Tier 1 Storage) and higher throughput storage (Tier 2 Storage). In most implementations, Writers and Readers may be oblivious to the tiered storage model from an API perspective.

Append Only Log

Figure 15:
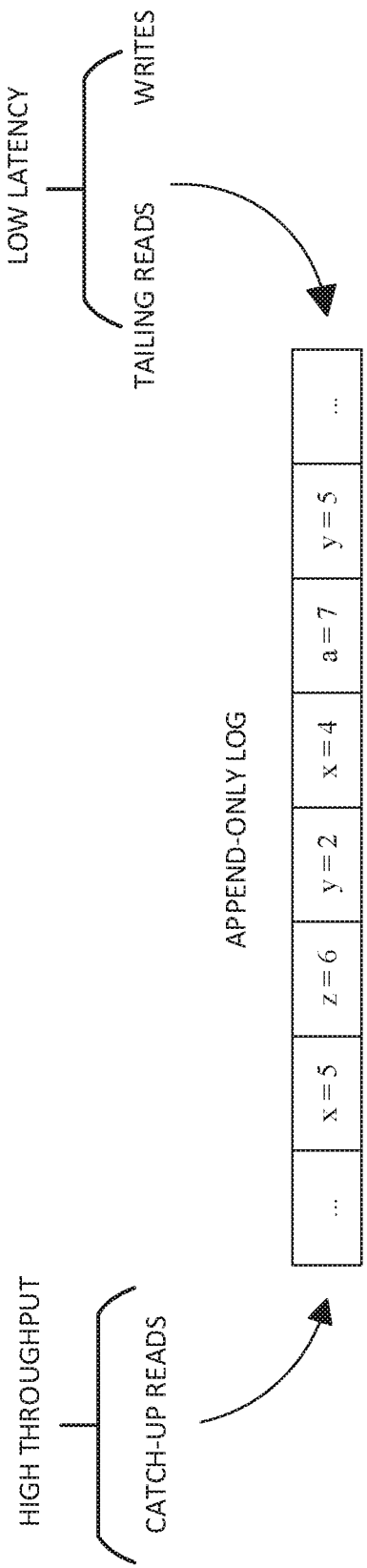
FIG. 15 illustrates an example append-only log in accordance with implementations of this disclosure.

FIG. 15 illustrates an example append-only log in accordance with implementations of this disclosure. In some embodiments, write activity and much of the read activity may happen at an end tail of the log. In many embodiments, writes may be appended to a log and many this may enable reads to the data as fast as it arrives in the log. In many embodiments, data access mechanisms described herein may be dominated by the need for low-latency—low latency writes by Writers and near real time access to the published data by Readers.

In certain embodiments, not all Readers may read from the tail of the log. In some embodiments, certain Readers may want to read starting at some arbitrary position in a log. In some embodiments, reads from an arbitrary position may be referred to as catch-up reads. Conventionally, access to historical data traditionally was done by batch analytics jobs, often using HDFS and Map/Reduce. In many embodiments, using techniques of the instant disclosure, it may be possible to access historical data as well as current data by just accessing the log. In a particular embodiment, the historical data may be stored in SSDs. In some embodiments, the current disclosure may provide a mechanism that allows customers to use cost-effective, highly-scalable, high-throughput storage for the historical part of the log, to enable retention of historical data.

In some embodiments, Tier 1 Storage may be used to make writing to Streams fast and durable and to make sure reading from the tail of a Stream is as fast as possible. In certain embodiments, Tier 1 Storage may be implemented on faster SSDs or even non-volatile RAM.

In many embodiments, Tier 2 Storage may provide a highly-scalable, high-throughput cost-effective storage. In some embodiments, Tier 2 may be deployed on spinning disks. In certain embodiments, the current disclosure may enable asynchronous migration of Events from Tier 1 to Tier 2 to reflect the different access patterns to Stream data. In certain embodiments, Tier 2 Storage may be based on an HDFS model.

Figure 16:
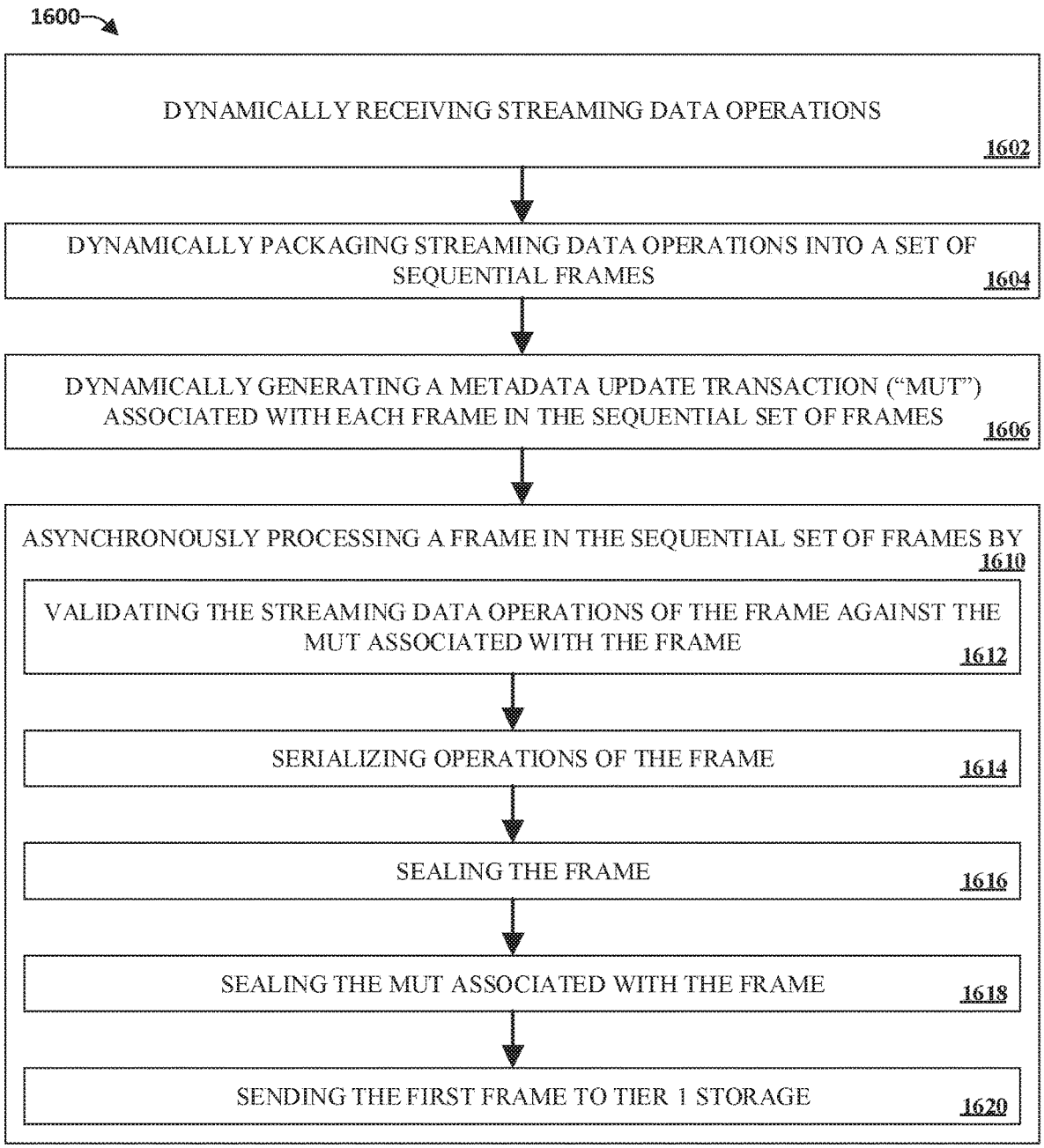
FIG. 16 illustrates an example flow diagram method for executing concurrent operations that depend on each other in accordance with implementations of this disclosure.
Figure 17:
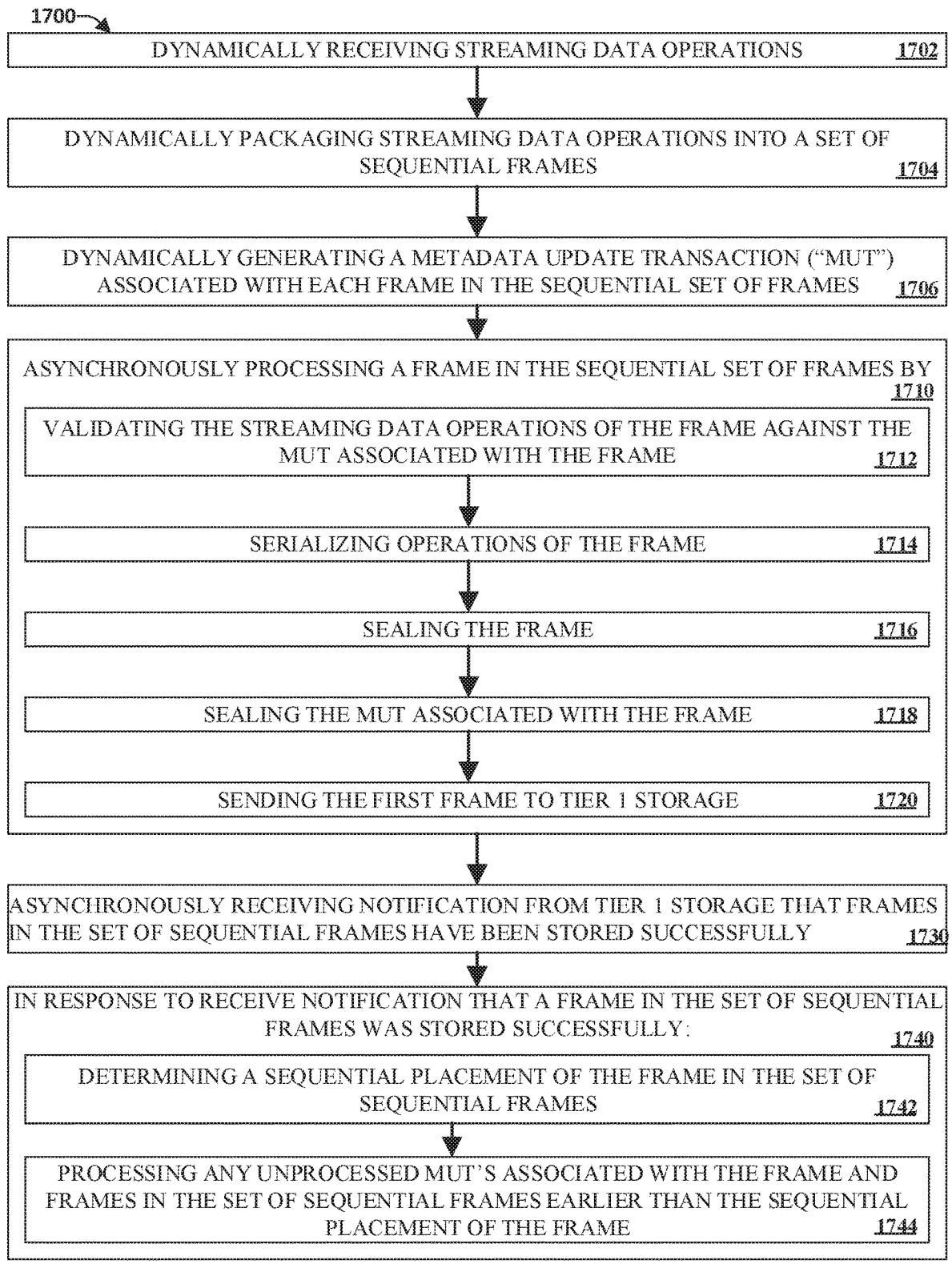
FIG. 17 illustrates an example flow diagram method for executing concurrent operations that depend on each other including receiving acknowledgement of a successful storage in accordance with implementations of this disclosure.
Figure 18:
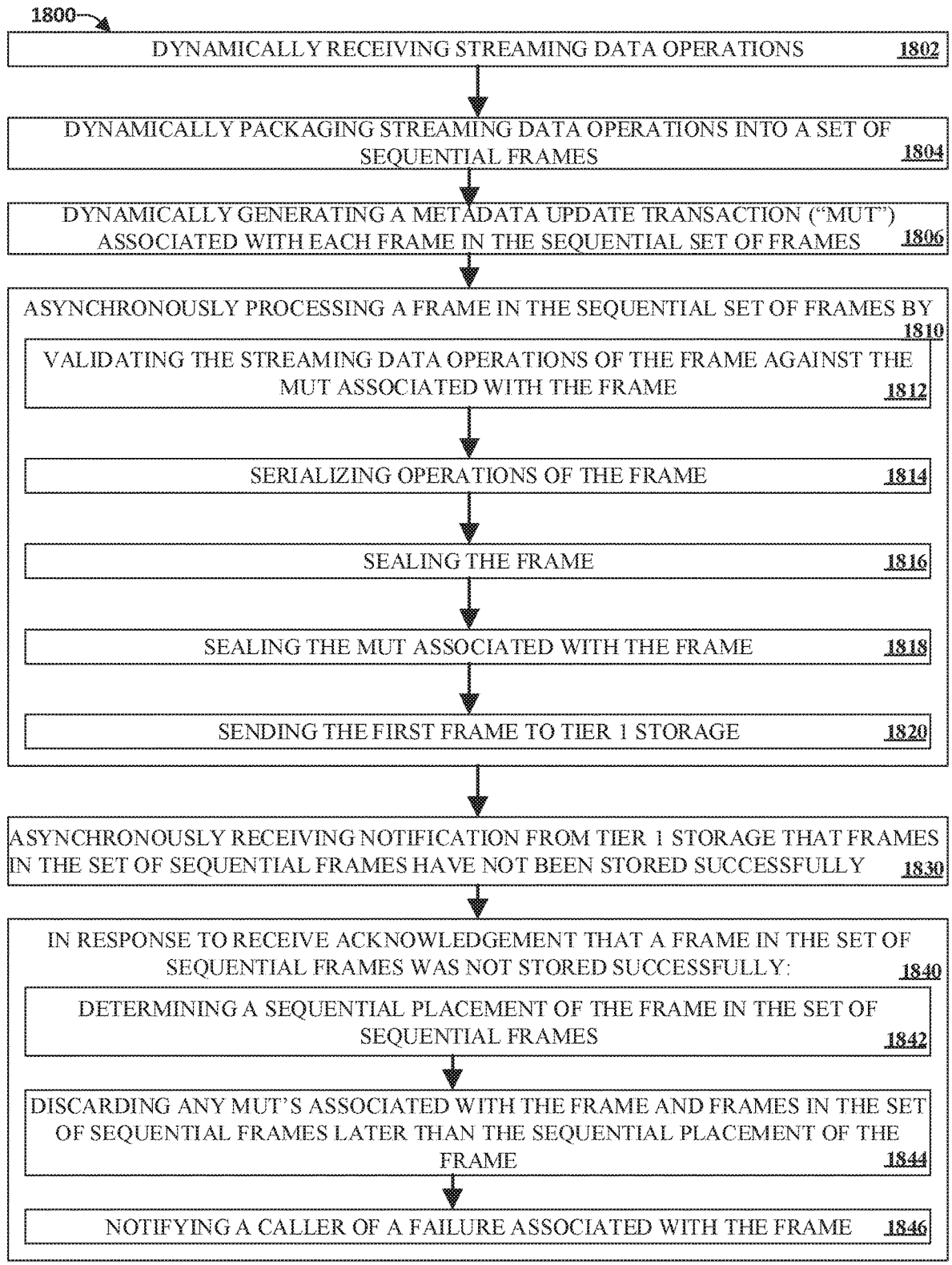
FIG. 18 illustrates an example flow diagram method for executing concurrent operations that depend on each other including receiving notification of unsuccessful storage in accordance with implementations of this disclosure.

FIGS. 16-18 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Referring now to FIG. 16, there is illustrated an example flow diagram method for executing concurrent operations that depend on each other in accordance with implementations of this disclosure.

At 1602, streaming data operations can be dynamically received. In on implementation, the streaming data operations can added to a pre-processing queue.

At 1604, streaming data operations can be dynamically packaged into a set of sequential frames. In one implementation, an operations processor can receive streaming operation in a continuous loop and determine whether to delay the packaging of streaming data operations into frames. For example, it can delay to wait for more streaming data operations to come into the queue to batch more together in a frame. It can also delay to throttle incoming operation in case the system is too busy. In one implementation, an existing frame can continue to be reused and added to until the frame is full. In one implementation, a new frame can be created if all existing frames are full. In one implementation, a set of sequential operations can span multiple frames and the MUT for the second frame is chained on top of the previous frame's MUT.

At 1606, a metadata update transaction ("MUT") can be dynamically generated and associated with each frame in the set of sequential frames. In one implementation, each frame can have a MUT associated with it that contains changes to the global metadata store that should made should the frame be successfully stored in Tier 1 storage.

At 1610, the frame can be asynchronously processed by steps 1612-1620. It can be appreciated that multiple frames can be processed asynchronously from each other. Multiple frames can be in flight for storage to Tier 1 at one time as described below with respect to step 1620.

At 1612, the streaming data operations can be validated against the MUT associated with the frame.

At 1614, the operations of the frame can be serialized. In one implementation, the frame is serialized to bytes, and if the operations do not all fit on the current frame, the current frame can be sealed and new frame can be created.

At 1616, the frame can be sealed. It can be appreciated that sealing the frame prevents any additional changes to a frame.

At 1618, the MUT associated with the frame can be sealed. It can be appreciated that sealing the MUT prevents any additional changes to the MUT.

At 1620, the frame can be sent to Tier 1 for storage.

Referring now to FIG. 17, there is illustrated an example flow diagram method for executing concurrent operations that depend on each other including receiving acknowledgement of a successful storage in accordance with implementations of this disclosure. Steps 1702-1720 can proceed similarly as to steps 1602-1620 as described above with respect to FIG. 16.

At 1730, notifications from tier 1 storage that frames in the set of sequential frames have been stored successfully can be asynchronously received. It can be appreciated that notifications that frames have been successfully stored may not be received in order, but if a frame was acknowledged as successfully stored, then any earlier frame must also have been successful too, even if the notification is not yet received.

At 1740, in response to receiving notification that a frame in the set of sequential frames was stored successfully, steps 1742-1744 can occur.

At 1742, a sequential placement of the frame in the set of sequential frames can be determined.

At 1744, any unprocessed MUT's associated with the frame and frames in the set of frames earlier than the sequential placement of the frame can be processed.

In one implementation, when a MUT is processed, an acknowledgement can be sent back to the caller that the operations and all proceeding operations are successful.

Referring now to FIG. 18, there is illustrated an example flow diagram method for executing concurrent operations that depend on each other including receiving notification of unsuccessful storage in accordance with implementations of this disclosure. Steps 1802-1820 can proceed similarly as to steps 1602-1620 as described above with respect to FIG. 16.

At 1830, in response to receiving notification that a frame in the set of sequential frames was not stored successfully, steps 1842-1846 can occur.

At 1842, a sequential placement of the frame in the set of sequential frames can be determined.

At 1844, any MUT's associated with the frame and frames in the set of frames later than the sequential placement of the frame can be discarded.

At 1846, the caller can be notified of the failure associated with the frame. In one implementation, the caller can resend operations associated with the failed frame and any later frames in the set of sequential frames.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    dynamically receiving streaming data operations;
    dynamically packaging streaming data operations into a set of sequential frames;
    dynamically generating a metadata update transaction ("MUT") associated with each frame in the sequential set of frames;
    asynchronously processing a frame in the sequential set of frames by:
        validating the streaming data operations of the frame against the MUT associated with the frame;
        serializing operations of the frame;
        sealing the frame;
        sealing the MUT associated with the frame; and
        sending the first frame to Tier 1 storage.

2. The method of claim 1, wherein operations include at least one of create segment, delete segment, append to segment, seal segment, or merge segments.

3. The method of claim 1, further comprising:
    asynchronously receiving acknowledgement from Tier 1 storage that frames in the set of sequential frames have been stored successfully; and
    in response to receive acknowledgement that a frame in the set of sequential frames was stored successfully:
        determining a sequential placement of the frame in the set of sequential frames; and
        processing any unprocessed MUT's associated with the frame and frames in the set of sequential frames earlier than the sequential placement of the frame.

4. The method of claim 3, wherein processing an MUT includes updating a global metadata store based on the MUT.

5. The method of claim 1, further comprising:
    asynchronously receiving notification from Tier 1 storage that frames in the set of sequential frames have not been stored successfully; and
    in response to receive acknowledgement that a frame in the set of sequential frames was not stored successfully:
        determining a sequential placement of the frame in the set of sequential frames;
        discarding any MUT's associated with the frame and frames in the set of sequential frames later than the sequential placement of the frame; and
        notifying a caller of a failure associated with the frame.

6. A system comprising at least one storage device and at least one hardware processor configured to:
    dynamically receive streaming data operations;
    dynamically package streaming data operations into a set of sequential frames;
    dynamically generate a metadata update transaction ("MUT") associated with each frame in the sequential set of frames;
    asynchronously process a frame in the sequential set of frames by:
        validating the streaming data operations of the frame against the MUT associated with the frame;
        serializing operations of the frame;
        sealing the frame;

sealing the MUT associated with the frame; and
sending the first frame to Tier 1 storage.

7. The system of claim 6, wherein operations include at least one of create segment, delete segment, append to segment, seal segment, or merge segments.

8. The system of claim 6, further configured to:
asynchronously receive acknowledgement from Tier 1 storage that frames in the set of sequential frames have been stored successfully; and
in response to receive acknowledgement that a frame in the set of sequential frames was stored successfully:
determine a sequential placement of the frame in the set of sequential frames; and
process any unprocessed MUT's associated with the frame and frames in the set of sequential frames earlier than the sequential placement of the frame.

9. The system of claim 8, wherein processing an MUT includes updating a global metadata store based on the MUT.

10. The system of claim 6, further configured to:
asynchronously receive notification from Tier 1 storage that frames in the set of sequential frames have not been stored successfully; and
in response to receive acknowledgement that a frame in the set of sequential frames was not stored successfully:
determine a sequential placement of the frame in the set of sequential frames;
discard any MUT's associated with the frame and frames in the set of sequential frames later than the sequential placement of the frame; and
notify a caller of a failure associated with the frame.

11. A non-transitory computer readable medium with program instructions stored thereon to perform the following acts:
dynamically receiving streaming data operations;
dynamically packaging streaming data operations into a set of sequential frames;
dynamically generating a metadata update transaction ("MUT") associated with each frame in the sequential set of frames;
asynchronously processing a frame in the sequential set of frames by:
validating the streaming data operations of the frame against the MUT associated with the frame;
serializing operations of the frame;
sealing the frame;
sealing the MUT associated with the frame; and
sending the first frame to Tier 1 storage.

12. The non-transitory computer readable medium of claim 11, wherein operations include at least one of create segment, delete segment, append to segment, seal segment, or merge segments.

13. The non-transitory computer readable medium of claim 11, with program instructions stored thereon to further perform the following acts:
asynchronously receiving acknowledgement from Tier 1 storage that frames in the set of sequential frames have been stored successfully; and
in response to receive acknowledgement that a frame in the set of sequential frames was stored successfully:
determining a sequential placement of the frame in the set of sequential frames; and
processing any unprocessed MUT's associated with the frame and frames in the set of sequential frames earlier than the sequential placement of the frame.

14. The non-transitory computer readable medium of claim 13, wherein processing an MUT includes updating a global metadata store based on the MUT.

15. The non-transitory computer readable medium of claim 11, with program instructions stored thereon to further perform the following acts:
asynchronously receiving notification from Tier 1 storage that frames in the set of sequential frames have not been stored successfully; and
in response to receive acknowledgement that a frame in the set of sequential frames was not stored successfully:
determining a sequential placement of the frame in the set of sequential frames;
discarding any MUT's associated with the frame and frames in the set of sequential frames later than the sequential placement of the frame; and
notifying a caller of a failure associated with the frame.

* * * * *